United States Patent Office 3,704,283
Patented Nov. 28, 1972

3,704,283
PROCESS FOR THE PRODUCTION OF SULPHUR-MODIFIED POLYCHLOROPRENES WITH IMPROVED STORAGE LIFE
Rudolf Mayer-Mader, Cologne, and Ernst Schwinum, Leichlingen, Germany, assignors to Bayer Aktiengesellschaft, Leverkusen, Germany
No Drawing. Filed Jan. 5, 1971, Ser. No. 104,131
Claims priority, application Germany, Jan. 24, 1970, P 20 03 147.4
Int. Cl. C08g 33/00
U.S. Cl. 260—79    6 Claims

ABSTRACT OF THE DISCLOSURE

A process for the production of sulphur-modified chloroprene polymers by emulsion polymerising chloroprene, 0 to 20% by weight, based on total monomers, of an ethylenically unsaturated copolymerisable compound, and 0.1 to 2% by weight, based on total monomers of sulphur wherein the copolymerisation reaction is carried out in the presence of from 0.5 to 5% by weight, based on total monomers of a water-soluble amine of the formula

in which $R^1$ and $R^2$ each represents an hydroxyalkyl group with 2 to 5 carbon atoms and $R^3$ has the same meaning as $R^1$ and $R^2$ or represents a methyl group.

---

It is known that 2-chloro-1,3-butadiene (chloroprene) can be polymerised in aqueous emulsion, both in the presence of emulsifiers and activators, and in the presence of sulphur (cf. U.S. patent specification No. 2,264,173). The polymers obtained are insoluble in benzene, especially when the polymerisation reaction is continued up to a monomer conversion in excess of 85%.

In order to obtain benzene-soluble polymers with the required viscosity, the polymer obtained during the polymerisation reaction is subjected to a degradation process (peptisation), resulting in the cleavage of sulphur bridges. Tetraethyl thiuram disulphide can, for example, be used as the peptising agent. Peptisation takes place in the chloroprene polymer latex and subsequently the peptised polymer is isolated in solid form by coagulation of the latex (cf. U.S. patent specification No. 2,234,215).

The polymers thus obtained, and the vulcanisates obtained from them, have some characteristic properties such as outstanding resistance to ozone and weathering and non-flammability. To this extent they are comparable with chloroprene polymers of the kind in which the required molecular weight is adjusted during polymerisation by means of molecular weight regulators rather than through subsequent degradation.

All sulphur-modified polychloroprenes have only a limited storage life (polymer viscosity changes with the storage period).

The object of the present invention is to improve the storage life of sulphur-modified polychloroprenes.

If chloroprene and sulphur are copolymerised in the presence of amines readily soluble in water at 20° C., corresponding to the formula

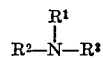

in which $R^1$ and $R^2$ represent hydroxyalkyl groups containing 2 to 5 carbon atoms and $R^3$ has the same meaning as $R^1$ and $R^2$ or represents a methyl group, storage-stable sulphur modified polychloroprenes are obtained.

Accordingly, the present invention relates to a process for producing sulphur-modified chloroprene polymers by emulsion polymerising chloroprene, 0 to 20% by weight, based on total monomers, of an ethylenically unsaturated copolymerisable compound and of from 0.1 to 2% by weight based on total monomers of sulphur in the presence of from 0.5 to 5% by weight, based on total monomers of a water-soluble amine of the formula

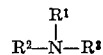

in which each $R^1$ and $R^2$ independently represents a hydroxyalkyl group with 2 to 5 carbon atoms and $R^3$ has the same meaning as $R^1$ and $R^2$ or represents a methyl group.

The polymer latex obtained during the polymerisation reaction can be peptised in the latex phase by means of 0.5 to 5% by weight, based on 100 parts by weight of polymer, of a peptising agent. The polymer can then be isolated by coagulation, separation and drying.

The polymers obtained by the process hereinbefore described show improved storage lives in comparison with comparable polymers prepared in the absence of amines during the polymerisation reaction.

The emulsion polymerisation reaction by which sulphur-modified polychloroprenes are obtained is known per se. It can be carried out in any of the usual emulsifiers, for example water-soluble salts, especially alkali metal salts, of long-chain fatty acids, resin acids, disproportionated abietic acid, aryl sulphonic acids and their formaldehyde condensation products, alkyl and aralkyl sulphonates and sulphates, oxethylated alcohols and phenols.

Suitable activators for the polymerisation reaction include the usual catalysts which are able to form free radicals, for example hydrogen peroxide, cumene hydroperoxide, water-soluble salts of peroxy disulphuric acid, 2,2′-azo-bis isobutyronitrile, salts of formamidine sulphonic acid, and combinations of potassium persulphate and β-anthraquinone sulphonic acid.

In general, an aqueous solution of the catalyst is added to an aqueous emulsion containing monomers and the emulsifier. Preferably, the polymerisation reaction is carried out at a pH value in the range from 7 to 13 and at a temperature of from 0 to 60° C., the total monomer content of the emulsion being adjusted to be from 30 to 60% by weight of the weight of the emulsion as a whole.

In order to provide polymers having a predetermined molecular weight, the polymerisation reaction can be carried out in the presence of regulator substances such as dialkyl xanthogene disulphides or mercaptans.

Examples of ethylenically unsaturated comonomers which can be copolymerised with chloroprene include acrylonitrile, methacrylonitrile, ethyl acrylate, 2,3-dichlorobutadiene and α-chloroacrylonitrile.

After any desired monomer conversion has been reached, the polymerisation reaction can be terminated by stoppers or stabilisers or by removing the unreacted monomer through steam distillation (cf. U.S. patent specification No. 2,467,769). Phenothiazine, p-tert.-butyl pyrocatechol and sodium dialkyl dithiocarbamate can be used as stoppers, whilst sterically hindered phenols or aromatic amines are suitable for use as stabilisers.

Before the sulphur-modified polychloroprene latex is processed it is adjusted e.g. to pH 11, for example with acetic acid, followed by the addition of a peptising agent. Preferably, tetra-alkyl thiuram disulphides are used as the peptising agents. They can be stirred into the polymer latex and are preferably used in the form of aqueous emulsions. Thereafter peptisation is carried out for a while in the latex phase, after which the polymer is precipitated from the latex by coagulation, for example low-temperature coagulation, isolated and dried.

According to the invention, amines corresponding to Formula I above which are soluble in water at 20° C. are used as the amines added during the emulsion polymerisation reaction.

Examples of these amines include tri-(isopropanol)amine, triethanolamine and N-methyl-di-(isopropanol)-amine.

It is important that the amines should be present during the polymerisation reaction. If they are added upon completion of the polymerisation reaction, i.e. during peptisation or just before working up by coagulation, the storage life of the chloroprene polymer obtained is not improved. Amines that are substantially insoluble in water, such as N-methyl stearylamine, or water-soluble amines with a structure different from that of Formula I, such as methyl piperazine, do not improve the stability of the polymer.

COMPARISON TESTS

Test A

An emulsion of the following composition is made up to prepare the sulphur-modified polychloroprenes:

| | Parts by wt. |
|---|---|
| Chloroprene | 100 |
| p-Tert.-butyl pyrocatechol | 0.01 |
| Sulphur | 0.6 |
| Desalted water | 120 |
| Sodium salt of disproportionated abietic acid | 4.5 |
| Sodium salt of a condensation product of naphthalene sulphonic acid and formaldehyde | 0.7 |
| Caustic soda | 0.4 |
| Tetrasodium pyrophosphate | 0.5 |

The sulphur is dissolved in the chloroprene and the resulting solution is stirred into the aqueous phase. Thereafter the temperature is increased to 43° C., followed by activation with an activator solution of the following constitution:

| | Parts by wt. |
|---|---|
| Potassium persulphate | 0.04 |
| β-Anthraquinone sulphonic acid | 0.004 |
| Desalted water | 1.3 |

When the monomer conversion has reached from 65 to 70% by weight, a stopper solution of the following constitution is added to the latex:

| | Parts by wt. |
|---|---|
| Toluene | 2 |
| Phenothiazine | 0.05 |

The latex is then freed from unreacted monomers by treatment with steam, and adjusted to a pH value of 11 with 20% by weight acetic acid. Thereafter 2.5 parts by weight of tetraethyl thiuram disulphide are added and the latex is stirred at 45° C. until the required viscosity is obtained. The latex is then worked up by low-temperature coagulation and dried.

Test B

To prepare a polymer in which the required molecular weight is directly adjusted by addition of a regulator during the polymerisation reaction, the following procedure is adopted:

| | Parts by wt. |
|---|---|
| Chloroprene | 100 |
| n-Dodecyl mercaptan | 0.25 |
| Desalted water | 120 |
| Sodium salt of disproportionated abietic acid | 4.5 |
| Sodium salt of a condensation product of naphthalene sulphonic acid and formaldehyde | 0.7 |
| Caustic soda | 0.5 |
| Tetrasodium pyrophosphate | 0.5 |

An emulsion is prepared from the components and polymerised at 43° C. by the addition of 2.5% by weight of formamidine sulphonic acid.

After a monomer conversion of 65 to 70% has been reached, the product is steam-distilled in order to remove the residual monomers. The pH value of the latex is adjusted to below pH 8 by the addition of acetic acid and the polymer is worked up by low-temperature coagulation and drying in a drying cabinet.

Test C

The emulsion contains the following constituents:

| | Parts by wt. |
|---|---|
| Chloroprene | 100 |
| p-Tert.-butyl pyrocatechol | 0.01 |
| Sulphur | 0.6 |
| N-methyl stearylamine | 0.5 |
| Desalted water | 120 |
| Sodium salt of disproportionated abietic acid | 4.5 |
| Sodium salt of a condensation product of naphthalene sulphonic acid and formaldehyde | 0.7 |
| Caustic soda | 0.5 |
| Tetrasodium pyrosphosphate | 0.5 |

The polymerisation reaction is carried out at 43° C. by means of a solution of the following constitution:

| | Parts by wt. |
|---|---|
| Potassium persulphate | 0.04 |
| β-Anthraquinone sulphonic acid | 0.004 |
| Desalted water | 1.3 |

At a monomer conversion of from 65 to 70%, polymerisation is stopped with a solution of phenothiazine in toluene (amount as in Test A), the residual monomer is removed from the latex by distillation with steam and the pH value of the latex adjusted to 11 with acetic acid. 2.5 parts by weight of tetraethyl thiuram disulphide are then added and stirring continued at 45° C. until the required viscosity has been obtained. The product is then worked up in the usual way by low-temperature coagulation and drying.

Test D

The emulsion contains the following constituents:

| | Parts by wt. |
|---|---|
| Chloroprene | 97 |
| 2,3-dichlorobutadiene | 3 |
| p-Tert.-butyl pyrocatechol | 0.01 |
| Sulphur | 0.6 |
| N-methyl piperazine | 0.5 |
| Desalted water | 120 |
| Sodium salt of disproportionated abietic acid | 4.5 |
| Sodium salt of the condensation product of naphthalene sulphonic acid and formaldehyde | 0.7 |
| Caustic soda | 0.5 |
| Sodium pyrophosphate | 0.5 |

The polymerisation reaction is carried out as in Test C.

At a monomer conversion of approximately 90%, the polymerisation reaction is stopped with a solution of phenothiazine in toluene (amount as in Test A), and the residual monomer removed from the latex by steam-distillation. 2.5 parts by weight of tetraethyl thiuram disulphide are then added per 100 parts by weight of polymer, and stirring is continued at 60° C. until the required viscosity has been obtained. The polymer is then worked up in the usual way. Heavy precipitation occurs during reduction of the pH value to 7 by the addition of acetic acid.

Test E

The emulsion contains the following constituents:

| | Parts by wt. |
|---|---|
| Chloroprene | 100 |
| p-Tert.-butyl pyrocatechol | 0.01 |
| Sulphur | 0.6 |
| Desalted water | 120 |
| Sodium salt of disproportionated abietic acid | 4.5 |
| Sodium salt of the condensation product of naphthalene sulphonic acid and formaldehyde | 0.7 |
| Caustic soda | 0.5 |
| Sodium pyrophosphate | 0.5 |

The polymerisation reaction is carried out as in Test C.

At a monomer conversion of from 65 to 70%, the polymerisation reaction is stopped with a solution of phenothiazine in toluene, (amount as in Test A), the residual monomer is removed from the latex by steam-distillation, and the pH value of the latex is adjusted to pH 11. 2.5 parts by weight of tetraethyl thiuram disulphide and 0.7 part by weight of tri-(isopropanol)-amine are then added per 100 parts by weight of polymer and stirring is continued at 60° C. until the required viscosity has been obtained. The polymer is then worked up in the usual way.

Test F

The emulsion contains the following constituents:

| | Parts by wt. |
|---|---|
| Chloroprene | 100 |
| p-Tert.-butyl pyrocatechol | 0.01 |
| Sulphur | 0.6 |
| Desalted water | 120 |
| Sodium salt of disproportionated abietic acid | 4.5 |
| Sodium salt of a condensation product of naphthalene sulphonic acid and formaldehyde | 0.7 |
| Caustic soda | 0.5 |
| Tetrasodium pyrophosphate | 0.5 |

The polymerisation reaction was carried out at 43° C. with a solution of the following constitution:

| | Parts by wt. |
|---|---|
| Potassium persulphate | 0.04 |
| β-Anthraquinone sulphonic acid | 0.004 |
| Desalted water | 1.4 |

At a monomer conversion of from 65 to 70%, the polymerisation reaction is stopped with a solution of phenothiazine in toluene (amount as in Test A), the residual monomer is removed from the latex by steam-distillation, and the pH value of the latex is adjusted to pH 11 with acetic acid. 2.5 parts by weight of tetraethyl thiuram disulphide are then added and stirring is continued at 45° C. until the required viscosity has been obtained. 0.7 part by weight of tri-(isopropanol)-amine are then added per 100 parts by weight of polymer in the latex. The latex is then stirred for 24 hours after which the polymer is worked up in the usual way.

EXAMPLE 1

The emulsion to be polymerised contains the following constituents:

| | Parts by wt. |
|---|---|
| Chloroprene | 100 |
| p-Tert.-butyl pyrocatechol | 0.01 |
| Sulphur | 0.6 |
| Tri-(isopropanol)-amine | 0.5 |
| Desalted water | 120 |
| Sodium salt of disproportionated abietic acid | 4.5 |
| Sodium salt of the condensation product of naphthalene sulphonic acid and formaldehyde | 0.7 |
| Caustic soda | 0.5 |
| Sodium pyrophosphate | 0.5 |

A catalyst solution of:

| | Parts by wt. |
|---|---|
| Potassium persulphate | 0.04 |
| β-Anthraquinone sulphonic acid | 0.004 |
| Desalted water | 1.3 | was used for polymerisation.

At a monomer conversion of from about 65 to 70%, the polymerisation reaction is stopped with a solution of phenothiazine in toluene (amount as in Test A), and the residual monomer is removed from the latex by steam-distillation. 2.5 parts by weight of tetraethyl thiuram disulphide are then added per 100 parts by weight of polymer in the latex, and stirring is continued at 60° C. until the required viscosity is obtained. The polymer is then worked up in the usual way.

EXAMPLE 2

The emulsion contains the following constituents:

| | Parts by wt. |
|---|---|
| Chloroprene | 97 |
| 2,3-dichloro-1,3-butadiene | 3 |
| p-Tert.-butyl pyrocatechol | 0.01 |
| Sulphur | 0.6 |
| Tri-(isopropanol)-amine | 0.5 |
| Desalted water | 120 |
| Sodium salt of disproportionated abietic acid | 4.5 |
| Sodium salt of the condensation product of naphthalene sulphonic acid and formaldehyde | 0.7 |
| Caustic soda | 0.5 |
| Sodium pyrophosphate | 0.5 |

Catalyst as in Example 1.

At a monomer conversion of from 65 to 70%. The polymerisation reaction is stopped with a solution of phenothiazine in toluene (amount as in Test A) and the residual monomer is removed from the latex by steam-distillation. 2.5 parts by weight of tetraethyl thiuram disulphide are then added per 100 parts by weight of polymer in the latex and stirring is continued at 60° C. until the required viscosity has been obtained. The polymer is then worked up in the usual way.

EXAMPLE 3

The emulsion contains the following constituents:

| | Parts by wt. |
|---|---|
| Chloroprene | 100 |
| p-Tert.-butyl pyrocatechol | 0.01 |
| Tri-(ethanol)-amine | 0.4 |
| Sulphur | 0.6 |
| Desalted water | 120 |
| Sodium salt of disproportionated abietic acid | 4.5 |
| Sodium salt of the condensation product of naphthalene sulphonic acid and formaldehyde | 0.7 |
| Caustic soda | 0.5 |
| Sodium pyrophosphate | 0.5 |

Catalyst as in Example 1.

At a monomer conversion of from 85 to 90%, the polymerisation reaction is stopped with a solution of phenothiazine in toluene (amount as in Test A) and the residual is removed from the latex by steam-distillation. 2.5 parts by weight of tetraethyl thiuram disulphide are then added per 100 parts by weight of polymer in the latex and stirring is continued at 60° C. until the required viscosity has been obtained. The polymer is then worked up in the usual way.

EXAMPLE 4

The emulsion contains the following constituents:

| | Parts by wt. |
|---|---|
| Chloroprene | 100 |
| p-Tert.-butyl pyrocatechol | 0.01 |
| Sulphur | 0.6 |
| N-methyl-di-(isopropanol)-amine | 0.5 |
| Desalted water | 120 |
| Sodium salt of disproportionated abietic acid | 4.5 |
| Sodium salt of the condensation product of naphthalene sulphonic acid and formaldehyde | 0.7 |
| Caustic soda | 0.5 |
| Sodium pyrophosphate | 0.5 |

Catalyst as in Example 1.

At a monomer conversion of from 65 to 70%, the polymerisation reaction is stopped with a solution of phenothiazine in toluene (amount as in Test A) and the residual monomer is removed from the latex by steam-distillation. 2.5 parts by weight of tetraethyl-thiuram disulphide are then added per 100 parts by weight of polymer in the latex, and stirring is continued at 60° C. until the required viscosity has been obtained. The polymer is then worked up in the usual way.

EXAMPLE 5

The emulsion contains the following constituents:

| | Parts by wt. |
|---|---|
| Chloroprene | 100 |
| p-Tert.-butyl pyrocatechol | 0.01 |
| Sulphur | 0.6 |
| Tri-(n-propanol)-amine | 0.5 |
| Desalted water | 120 |
| Sodium salt of disproportionated abietic acid | 4.5 |
| Sodium salt of the condensation product of naphthalene sulphonic acid and formaldehyde | 0.7 |
| Caustic soda | 0.5 |
| Sodium pyrophosphate | 0.5 |

Catalyst as in Example 1.

At a monomer conversion of from 65 to 70% the polymerisation reaction is stopped with a solution phenothiazine in toluene (amount as in Test A) and the residual monomer is removed from the latex by steam-distillation. 2.5 parts by weight of tetraethyl thiuram disulphide are then added per 100 parts by weight of polymer in the latex and stirring is continued at 60° C. until the required viscosity has been obtained. The polymer is then worked up in the usual way.

The polymers prepared in accordance with Tests A to F and Examples 1 to 5 are tested as follows in order to determine their properties.

The Mooney viscosity (cf. ASTM D 927 49 T) of the crude polymer is measured. In order to determine their mechanical properties, the polymers are mixed with the following components in the usual way on mixing rolls:

| | Parts by wt. |
|---|---|
| Polychloroprene | 100 |
| Semi-active furnace black | 29 |
| Stearic acid | 0.5 |
| Stabiliser PBN | 2 |
| Magnesium oxide | 4 |
| Zinc oxide | 5 |

In the case of Example 2, 0.5 part by weight of ethylene thiourea are added as vulcanisation accelerator.

Vulcanisation is carried out for 30 minutes at 150° C. The vulcanisates obtained in this way show the following properties:

TABLE I

| Ex. | Strength, kg./cm.² | Breaking elongation (percent) | Mooney stability (storage at 60° C.) after— | | | | | | |
|---|---|---|---|---|---|---|---|---|---|
| | | | 0 days I | 1 day II | III | 2 days IV | V | 3 days VI | VII |
| A | 152 | 820 | 45 | 51 | + 6 | 56 | +11 | 59 | + 14 |
| B | 217 | 825 | 39 | 40 | + 1 | 40 | + 1 | 41 | + 2 |
| C | 147 | 710 | 43 | 34 | − 9 | 29 | −14 | 26 | − 17 |
| D | 137 | 740 | 65 | 70 | + 5 | 73 | + 8 | 73 | + 8 |
| E | 150 | 810 | 44 | 48 | + 4 | 52 | + 8 | 56 | + 12 |
| F | 151 | 815 | 45 | 50 | + 5 | 54 | + 9 | 57 | + 12 |
| 1 | 151 | 890 | 42 | 42 | ± 0 | 41 | − 1 | 40 | − 2 |
| 2 | 138 | 770 | 45 | 43 | − 2 | 43 | −22 | 42 | − 3 |
| 3 | 140 | 760 | 43 | 42 | − 1 | 41 | − 2 | 40 | − 3 |
| 4 | 133 | 760 | 61 | 61 | ± 0 | 59 | − 2 | 58 | − 3 |
| 5 | 148 | 870 | 44 | 43 | − 1 | 43 | − 1 | 42 | − 2 |

I, II, IV, VI are Mooney viscosities, ML4' measured at the indicated time; III=II−I; V=IV−I; VII=VI−I i.e. the change in Mooney viscosity or the Mooney stability.

Table I shows that the Mooney viscosity of vulcanisates of chloroprene polymers prepared in accordance with the invention shows little or no change during storage, whilst vulcanisates based on the chloroprene polymers A and C to F prepared for comparison purposes undergo considerable changes in their viscosity during the test. Accordingly, the products according to the invention show considerably improved storage life. They behave in the same way as a chloroprene polymer (B) whose Mooney viscosity and molecular weight were controlled by the addition of a regulator during the polymerisation reaction.

In comparison with chloroprene polymers whose molecular weight is directly regulated (B), the sulphur-modified polychloroprenes according to the invention show better tear resistance. There is no need for an additional vulcanisation accelerator to be added.

We claim:

1. A process for the preparation of sulphur-modified chloroprene polymers which comprises polymerizing chloroprene and 0 to 20% by weight of an ethylenically unsaturated comonomer in aqueous emulsion in the presence of from 0.1 to 2% by weight of sulphur and from 0.5 to 5% by weight of a water-soluble amine of the formula

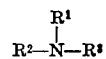

wherein $R^1$ and $R^2$ are each hydroxyalkyl having 2 to 5 carbon atoms and $R^3$ is methyl or hydroxyalkyl having 2 to 5 carbon atoms, said percentages by weight being based on total monomers.

2. The process of claim 1 wherein the amine of said formula is triisopropanolamine, triethanolamine, or N-methyldiisopropanolamine.

3. The process of claim 1 wherein the comonomer is acrylonitrile, methacrylonitrile, ethylacrylate, 2,3-dichlorobutadiene, α-chloroacrylonitrile or a mixture thereof.

4. The process of claim 1 wherein polymerization is carried out at a pH of from 7 to 13.

5. The process of claim 1 wherein polymerization is carried out at a temperature of from 0 to 60° C.

6. The process of claim 1 wherein an emulsion having a monomer content of from 30 to 60% by weight, based on total emulsion, is polymerized.

References Cited
UNITED STATES PATENTS

| | | | |
|---|---|---|---|
| 2,264,173 | 11/1941 | Collins | 260—29.7 NQ |
| 3,378,538 | 4/1968 | Sparks | 260—92.3 |
| 3,397,173 | 8/1968 | Collette et al. | 260—45.9 |
| 3,507,825 | 4/1970 | Paris | 260—45.9 |
| 3,318,832 | 5/1967 | Sparks et al. | 260—29.7 |
| 3,488,313 | 1/1970 | Sparks et al. | 260—29.7 |
| 2,875,184 | 2/1959 | Tann | 260—79.5 |
| 3,025,257 | 3/1962 | Coler et al. | 260—32.6 |
| 3,408,342 | 10/1968 | Horvath et al. | 260—45.9 |

DONALD E. CZAJA, Primary Examiner

M. I. MARQUIS, Assistant Examiner

U.S. Cl. X.R.

260—29.6 MN, 29.6 MQ, 29.7 NQ, 29.7 N, 41.5 R, 45.9 R, 92.3